United States Patent Office
3,468,815
Patented Sept. 23, 1969

3,468,815
EXTENDED ZEOLITIC STRUCTURES
Edward L. Cole, Fishkill, Edwin C. Knowles, Poughkeepsie, and Eugene E. Sensel, Beacon, N.Y., assignors to Texaco Inc., New York, N.Y., a corporation of Delaware
No Drawing. Filed Sept. 11, 1967, Ser. No. 666,939
Int. Cl. C01b 33/28; B01j 11/46
U.S. Cl. 252—455                      11 Claims

ABSTRACT OF THE DISCLOSURE

The zeolitic structures are composed of a support, a layer of alumina thereon and a layer of crystalline aluminosilicate zeolite formed in situ on and from the alumina layer. The properties of the structures render it applicable to hydrocarbon separation and conversion processes including hydrogenation of olefin, hydrocracking of petroleum fractions, catalytic cracking of gas oils, isomerization of paraffins, dehydrogenation of paraffins, hydrofining of lubricating oils, desulfurization of residue and numerous oxidation processes.

---

This invention relates to improved crystalline aluminosilicates. In particular it relates to crystalline zeolitic aluminosilicate structures, to methods for producing such structures and to hydrocarbon conversion and separation processes employing such structures.

Synthetic crystalline zeolitic aluminosilicates constitute well known materials which have heretofore been employed as selective adsorbents, carriers and catalysts. In general such crystalline materials have been grown under designated conditions of temperature and time from alkali oxide, aluminum oxide, silica and water precursors. Processes employing such materials have often placed excessive demands upon such materials in that the crystals suffered from poor attrition resistance, heat capacity and thermal conductivity which in turn required inordinate monitoring of reaction conditions. Although the art has suggested, for example, supported aluminosilicate compositions where the crystalline zeolitic aluminosilicate is impregnated within the pores of a support material, such expedients have not overcome other serious objections including the deposition of carbonaceous deposits or fouling leading, for example, to a decrease in activity and selectivity where such materials are employed in catalytic processes. Further in those instances where the adsorptive properties of the crystals are used to advantage, the propensity of the crystalline material to fracture into fine particles has led to the development of agglomerates utilizing binders to increase the strength of the adsorbent. Though such expedients have maintained the strength of the crystalline material they have nevertheless detracted and diminished from the adsorptive properties.

It is, therefore, an object of this invention to provide extended structures having improved catalytic and/or adsorptive properties over long periods of time.

Another object of this invention is to provide a method for preparing such extended structures.

A further object of this invention is to provide processes for the separation or conversion of fluid mixtures by providing an improved selectively adsorbent or catalytically active extended zeolitic material.

Yet another object of this invention is to provide a structure whereby temperature control may be maximized by rapid heat exchange in exothermic or endothermic reactions.

These and other objects of this invention will become more apparent from reading the following detailed description of the invention.

Broadly this invention contemplates an extended zeolitic structure comprising a support, a layer of alumina on the support and a crystalline zeolitic aluminosilicate formed in situ on the alumina layer.

The novel structures of our invention involve broadly a substrate or support, preferably of extended dimensions, having an adherent film or layer of alumina formed thereon. The alumina deposited or formed on the substrate is sufficiently tenacious to withstand ordinary usage and is not damaged or impaired upon relatively severe abrading, jarring, etc. Thereafter the film or layer of alumina is at least partially converted to a crystalline metal aluminosilicate zeolite and such conversion is achieved by, for example, reacting the coating of alumina in an aqueous medium with a nutrient comprising a source of silica and a water soluble alkali oxide. The conversion of the alumina layer where the zeolitic structure is formed in situ results in a zeolitic material formed on and to some extent within the alumina layer. The zeolitic material so prepared may be in a form possessing catalytic activity or be capable of being rendered susceptible of catalytic activity by subsequent treatment as more fully explained below. Simultaneously, the zeolitic material possesses adsorptive properties. Where adsorptive zeolitic materials are contemplated adjustment of the silica and alkali metal ratios, for example, permits the formation of various zeolites including but not limited to zeolites E, Z, Q, M, F, B, H, J, W, R. S, K–G, A, T, philipsite, analcime, chabazite, gmelinite, erionite, X, Y, faujasite, mordenite, and clinoptilolite to be produced from and on the extended substrate. Moreover such structures are useful as catalyst bases and may be ion exchanged or simply impregnated. Further, the advantages that reside with alumina on a substrate will be retained and, additionally, the surface will have the advantages of a zeolitic material possessing adsorptive properties and where desired catalytic activity. Where the crystalline layer possesses catalytic activity this invention is particularly advantageous and economical for use in a number of catalytic processes conducted in either liquid or vapor phase including hydrogenation of olefins, hydrocracking of petroleum fractions, catalytic cracking of gas oils, isomerization of paraffins, selective cracking of paraffins, dehydrogenation of paraffins and naphthenes, hydrorefining of lubricating oils, desulfurization of residues, and such oxidation processes as the oxidation of naphthalene to phthalic anhydride.

Various methods may be employed for providing the substrate with an adherent film of alumina. One such method for example is found in U.S. Patent 3,231,520 to Robert J. Leak and Harry Le Bleu, where the substrate is contacted with an aqueous solution of sodium aluminate thereby forming an adherent film of alumina on the substrate. The substrate or support is preferably of extended dimensions and is of a length and geometric surface area substantially greater than that of discrete particles. The substrate employed in the structure of our invention is not restricted to any particular configuration or to any particular material. The substrate may in fact be formed of a metal, alloy or non-metal suitable for use in a catalytic reactor and may include such materials as aluminum, steel, stainless steel, nickel, titanium, including sintered metal materials, refractory or ceramic materials including, for example, glasses, magnesia, alumina and silica, refractory metal oxides, silicates or carbides. The configuration of the substrate may include bars, balls, chains, mesh, plates, saddles, sheet, tubes, wire or the like. Where the substrate is composed of aluminum, the aluminum may be anodized by conventional techniques as, for example, employing a 15% sulphuric acid bath at 70° F. and at 15 volts A.C. To secure different degrees of anodization, the time of anodization may be varied from 15 minutes to one hour. Under these conditions a hydrated alumina film is easily secured. This anodized alumina surface may in turn be similarly converted to a zeolitic material.

Whether the techniques of Leak are employed for providing the support with an alumina layer or in the instance of anodization employing a sulphuric acid treatment, the coating should not be less than 5 mg./cm.$^2$, and coatings of 50 mg./cm.$^2$ or higher may be secured. The coating thickness may range from about 0.5 mil to 100 mils or higher. The coating is copiously washed to remove any occluded caustic or acid. Thereafter, it is essential to this invention that the alumina layer be kept in a moist or damp state, that is, the preservation of the highly hydrated alumina state. The hydrated alumina layer is thereafter hydrothermally converted, in situ, with a source of silica such as silica hydrogel or hydrosol and an alkali metal oxide or hydroxide such as sodium or potassium hydroxide. The source of silica and metal oxide may in fact be one and the same as, for example, sodium silicate solution. The damp or moist hydrated alumina coated extended substrate is contacted with an aqueous paste or solution of the appropriate nutrients or in the instance where a paste is employed, the paste may be directly coated onto the alumina surface. Where a nutrient solution is employed, the hydrated coated alumina substrate may be, for example, immersed in the nutrient solution.

The hydrated alumina and nutrients are maintained under conditions susceptible to the growth of crystals. Such conditions generally entail maintaining the support in contact with the nutrients for an extended period of time at an elevated temperature. The crystals are permitted to grow to a size ranging from about 0.01 to about 5 microns during which time temperatures ranging from room temperature to 600° F. are employed. Similarly, the period of crystal growth may vary from about 2 hours to a week or more.

Digestion and crystallization of the hydrated alumina may, as noted above, be performed in a single step, but preferably two stages are employed which provide a more uniform crystal growth. Thus a low temperature digestion or nucleation step at temperatures ranging from about room temperature to 100° F. followed by a crystallization step at elevated temperatures of from about 200 to 600° F. are desirable. Seeding with minor amounts of commercially available zeolites may also be used to good advantage. Illustrative of the range of crystallization temperatures for various zeolite materials are the growth of A type zeolites where temperatures below 250° F. are desirable whereas hydrothermal operations at temperatures of from 400 to 600° F. are needed in the growth of mordenite. Where two steps are employed digestion times of 24 to 96 hours are suitable with crystallization times of 1 to 24 hours. The composite product is thereafter water washed until the water in equilibrium with the zeolite has a pH ranging from about 8 to 12.

The composite may be subjected, preferably before final drying to various treatments depending on its ultimate application. For example, the product may be ion exchanged or treated with steam, carbon dioxide, hydrogen and the like or calcined in air. The calcination treatment is generally carried out at a temperature ranging from about 300 to 1200° F. for about one half to 48 hours, consistent with the intended use of the product.

The quantity and type of crystalline aluminosilicate prepared on the surface of the alumina is governed, in addition to contact time, by the concentration of the alumina and nutrients in the forming mixture. Optionally, minor amounts of alumina or alkali aluminate may be added to the nutrient solution or hydrogel as an adjuvant to zeolite formation. Such addition assist in controlling both the rate of reaction and type of zeolite formed on the alumina surface. In general the crystalline aluminosilicate formed will constitute between 2 and 90 and preferably between 5 and 40 weight percent of the combined zeolite-alumina coating. The type of zeolite formation derived will depend upon the alumina-nutrient composition conveniently expressed in the ratios of:

(A) $SiO_2/Al_2O_3$ ---------------------------- 1.0–25.0
(B) $Na_2O/SiO_2$ ----------------------------- 0.1–5.0
(C) $H_2O/Na_2O$, 10–200 or above.

For example, Type A zeolites are promoted when the above oxide ratios are: A (1–2.4), B (0.5–1.5) and C (30–100). Type X, representing silica rich zeolites would possess ratios of: A (2.5–5.0), B (0.5–1.5) and C (30–100); Type Y ratios of: A (5–25), B (0.25–0.6) and C (10–100); Analcime: A (5–6), B (0.2–1) and C (40–100); Mordenite: A (8–12), B (0.1–5) and C (40–100). The alkaline liquor is normally based on sodium but the ratios expressed above are to be understood to include other metals, such as lithium, or potassium or metals of the alkaline earth group such as calcium or mixtures thereof, similarly contemplated for such zeolites of the S, T or philipsite group.

Where the product is intended for use as an adsorbent the zeolite may be in the form of the alkali or alkaline earth metal aluminosilicate. Similarly, where the product is to be employed as a catalyst, it may also be present as the alkali metal zeolite or it may be desirable to replace the metal ion of the initially formed metal aluminosilicate with various other ions. In this connection the alkali or alkaline earth metal ion of the initially formed crystalline alkali or alkaline earth metal aluminosilicate may be replaced by base exchanging with cobalt, nickel, zinc, copper, chromium, iron, zirconium, thorium, beryllium, manganese, palladium, tin, ammonium, rhenium, aluminum, rhenium, aluminum, silver, hydrogen, strontium, gold, potassium, calcium, platinum, cadmium, mercury, lithium, magnesium, lanthanum, cerium and other rare earth metals. Exchanging with ammonium hydroxide or an ammonium salt solution along with subsequent heating renders the zeolite to the corresponding hydrogen form. The zeolitic material may contain the exchanged ions as metals, oxides, sulfides, or salts including inorganic and organic, such as phosphates, nitrates, carbonates, formates and combinations thereof. In place of or in addition to ion exchanging, the composite may be impregnated with any of the aforementioned exchanging nutrients. Replacement is suitably accomplished by contacting the initially formed crystalline aluminosilicate contained on the surface of the alumina with a solution of an ionizable compound of the ion which is to be zeolitically introduced into the aluminosilicate structure for sufficient time and at a temperature such as to bring about the extent of desired introduction of such ion. After such treatment the ion exchanged product is water washed, dried and calcined.

The method described herein is particularly applicable for the preparation of a supported crystalline zeolite having a structure of well defined intracrystalline dimensions and which has the ability by reason of its intracrystalline dimensions to allow the passage into or out of its crystalline cavities of only certain molecules, i.e., of molecules having particular shape and size. Such zeolites wherein only molecules of particular size and shape are able to enter are sometimes referred to as molecular seives.

Molecular sieves are essentially dehydrated forms of hydrous siliceous zeolites containing varying quantities of alkali or alkaline metal, silicon and aluminum with or without other metals. A portion or all of the alkali metal or ions normally contained in the molecular sieve structure may be zeolitically replaced with a number of other ions. The structure itself contains a large number of small cavities interconnected by a number of small channels which are of a precisely uniform size. The zeolites themselves may be represented by the general formula:

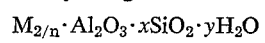

where M represents a metal, $n$ its valence, $x$ has the values ranging from 1.8 to 10 and $y$ ranges from 2 to 8. In dehydrated zeolites, $y$ will be substantially 0.

Illustrative of a highly preferred zeolite surface is analcime, a zeolite having a pore diameter of 2.8 A. Extended zeolite materials comprising analcime formed in situ on alumina may be employed as a means for separating hydrogen from gaseous mixtures containing, for example, hydrogen (diameter 1 A.), carbon monoxide (diameter 3.5 A.) and methane (diameter 3.8 A.).

The following examples further illustrate our invention:

Example I

Forty grams of sodium hydroxide pellets were dissolved in one liter of water contained in a two liter beaker. 27 grams of 99.99% aluminum pellets were added to the beaker. After heating on a steam plate for 6 hours a good coating of hydrated alumina had formed on the beaker and an additional ten grams of aluminum were added to the solution. A 2¼ x 3 inch jar weighing 73 grams was three-fourths filled with this solution along with an additional 5 grams of aluminum. The jar was heated on the steam plate for 2.5 hours, the solution emptied and the jar washed well with water. The jar was well coated on the interior with alpha alumina trihydrate and a weight increase of 4 grams was noted.

Two grams of sodium metasilicate was formed into a paste by the addition of 0.7 gram of distilled water and a seed of 0.02 gram of powdered commercial grade zeolite X. 2.68 grams of paste was then coated on the damp alpha alumina trihydrate coating. The jar was then sealed, held at 80° F. for 72 hours and thereafter at 210° F. for 24 hours. After cooling and water washing the jar's interior, an examination of the coating showed it to be firm and even. X-ray analysis of the coating revealed a pattern of approximately 60% alpha alumina trihydrate, approximately 26% type 4A zeolite and the remainder zeolite X.

Example II

Two grams of sodium metasilicate and 0.02 gram of commercial grade zeolite X were mixed with 0.7 gram of distilled water and formed into a paste. Approximately ⅓ of this paste was thinly coated on one side of an aluminum strip having an anodized surface. The strip was placed in a screw top glass jar which also contained a 30 ml. beaker filled with water. The jar was sealed and held at 80° F. for 72 hours and then at 210° F. for 24 hours. Examination of the strip showed a thin white coating weighing 0.432 gram. After water washing and drying the strip a portion of the surface coating was scraped off and examined by X-ray diffraction. The pattern indicated that the coating contained the sodium forms of Type A and Type X zeolites. The anodized aluminum strip employed in this example measured 1 inch by 2 inches by ⅟₁₆ of an inch and was anodized employing a 15% sulfuric acid solution at 15 volts and at 70° F. for 40 minutes.

Example III 1000 mls. of water were placed in a 2000 ml. beaker and 40 grams of sodium hydroxide added. The beaker was heated to 185° F. and thereafter 27 grams of aluminum pellets were added and the beaker allowed to stand on a steam plate overnight whereupon an additional 25 grams of aluminum and 30 ml. of water were added. A stainless steel strip measuring 3" x ½" x ⅟₁₆" and weighing 12.7874 grams was placed in the solution and supported by glass rods on the bottom of the beaker. After 6½ hours the stainless steel strip was removed and investigation indicated that it possessed a thick damp coating of alpha alumina trihydrate. The coated strip weighed 14.2789 grams, a weight increase of 1.492 gram. A sodium metasilicate-water paste was applied to the alumina coating and the pasted strip placed in a glass jar containing 20 ml. of water, the jar sealed and held at 80° F. for 72 hours and thereafter at 210° F. for 24 hours. After cooling, water washing and drying, the strip weighed 14.2416 grams and was examined by X-ray diffraction which yielded a composite pattern indicative of the sodium forms of type A and C zeolites.

Example IV

A glass jar measuring 2½ inches in diameter and 3¼ inches high coated with 16 grams of moist hydrated alumina on its interior was pasted with 4 grams of sodium metasilicate and 1.5 grams of water. The jar was sealed, heated at 80–82° F. for 72 hours and thereafter at 210–212° F. for 24 hours. After cooling, washing with water and drying, the jar was found to have a heavy white deposit. A portion of the coating was scraped for X-ray study which indicated that the coating was predominantly alpha alumina trihydrate along with zeolite C.

Example V

A stainless steel strip weighing 12.5240 grams, measuring 3" x ½" x ⅟₁₆" having 2.305 grams of damp alumina on the surface and prepared as in Example IV was placed upright in an 850 ml. autoclave. Five grams of sodium metasilicate in 425 ml. water were added to the autoclave and heated for 20 hours at 550–560° F. The coating was examined by X-ray diffraction whereupon the zeolite analcime and alpha alumina trihydrate were identified.

Example VI

A chrome-steel mesh weighing 53.0108 grams was formed into a 2¼" x 5" roll was washed with benzene, acetone and dried. Fifteen hundred ml. of distilled water were placed in a 2000 ml. beaker along with 60 grams of sodium hydroxide. Thereafter 40.5 grams of aluminum pellets were added to the caustic solution and the latter was subsequently heated to 180° F. Over a period of 12 hours an additional 80 grams of aluminum pellets were added together with 140 ml. of water. The mesh coated with alpha alumina trihydrate was subsequently water washed and the damp mesh weighed 277 grams.

A solution of 10 grams of sodium metasilicate in 1000 ml. of water was prepared. The damp mesh pad was placed in an autoclave and 720 mls. of the above solution added thereto. The autoclave was heated to 550–560° F. for 20 hours at a pressure of approximately 900 p.s.i.g. The pad after rinsing with water and draining weighed 277.5 grams and had an excellent tight coating on the individual mesh wires. The surface of the pad was scraped and X-ray diffraction analysis of the scrapings showed a relatively pure analcime on alpha alumina trihydrate.

The analcime-alumina coated mesh is thereafter placed in a 2½" diameter glass tube, filled with 100 ml. of water and additional water is drawn from the tube at the rate of 50 cc. per minute. A total of 4000 ml. of water is passed over the pad and the tube is filled with 0.5 N HCl and additional 0.5 N HCl is passed through the tube at the rate of 25 ml. per minute. A total of 2000 ml. of 0.5 N HCl is passed over the mesh. The tube is then filled with distilled water and additional water passed into the tube and subsequently withdrawn at the rate of 50 ml. per minute until a total of 4000 ml. passes over the pad. The tube is next filled with 500 ml. of a 5% nickel chloride solution. The solution in the tube is heated to 175° F. and held for one hour, drained and a fresh 500 ml. portion of the nickel chloride solution added. The system is again heated to 175° F. for one hour, drained and cooled to room temperature. The pad is washed with 1000 ml. of water, and dried on a steam plate.

The dry pad is placed in a 3" diameter steel pipe. Hydrogen is introduced into the pipe at the rate of 10 liters per hour and the temperature of the pad is slowly raised to 800° F. Hydrogen flow is continued for 8 hours at 800° F. and thereafter at a reduced temperature of 200° F. at which point a mixture comprising 1.6 moles of hydrogen per mole of ethylene is fed into the reactor and the total flow of gas is adjusted so that 90 volumes of gas is fed per volume of catalyst pad (324 ml.) per hour. By this technique, ethylene is converted to ethane.

Example VII

A titanium mesh formed into a roll measuring 4 inches long and ⅝ inch in diameter was washed with benzene, acetone, dried and weighed 5.9708 grams. Alpha alumina trihydrate was deposited on the titanium mesh according to the procedure employed in Example VI. The moist mesh weighed 34.5 grams. Twenty grams of sodium metasilicate, 0.2 gram of finely powdered commercial grade zeolite X and 7 grams of water were formed into a paste. Approximately ½ of the paste was used in coating the moist pad. The pad was placed in a screw-top jar containing a 30 mls. beaker filled with water and the sealed jar heated for 72 hours at 80° F. and then at 210° F. for 24 hours. Inspection of the pad showed a thin white coating on the individual pad wires. X-ray diffraction of samples of pad coating showed the presence of the sodium forms of Zeolite A and Zeolite X both supported on the alpha alumina trihydrate. Of the two Zeolites, the Zeolite X predominated approximately in the ratio of 70:30.

The titanium coated pad is then placed in a 2 foot long, ¾" diameter glass tube fitted with a stopcock. 150 ml. portions of distilled water are allowed to drain through the pad until the total of 450 ml. of wash is used. 1000 ml. of a 10% aqueous ammonium chloride solution is prepared of which 150 ml. is poured onto the pad and the temperature held at about 100° F. for thirty minutes. The solution is drained and the treatment repeated for one hour. Thereafter the solution is drained and the pad washed with three 150 ml. portions of water. The pad is dried at 212° F. for one hour and then placed into an electrically heated stainless tube reactor. With air flowing through the tube at a rate of about 2 liters per hour the tube is heated to 950° F. over a 30 minute period and held at 950° F. for 15 minutes. Nitrogen is flushed through the tube while cooling to 700° F. Subsequently normal hexane is introduced at a contact time of 12 seconds. By this procedure thirty-one percent of the normal hexane is converted to $C_1$ to $C_5$ products, predominantly propane and propylene.

Example VIII

A nickel mesh formed into a roll measuring four inches long and five-eighths inch in diameter was washed with benzene, acetone dried and weighed 16.3751 grams. Alpha alumina trihydrate was deposited on the nickel mesh according to the procedure employed in Example VI. The damp pad weighed 59.2 grams. After placing the damp pad in a screw-top jar, a solution of 6 grams of sodium metasilicate in 325 mls. of water was added to the jar. The pad was completely covered with the solution and the jar was sealed and held for 80 hours at 80 to 85° F. and thereafter for 20 hours at 210 to 212° F. The pad was thereafter washed with two 400 ml. portions of distilled water. A heavy white deposit was observed on each wire of the nickel mesh. Scrapings of the mesh coating were examined by X-ray diffraction and showed the presence of Zeolite C on alpha alumina trihydrate.

The pad was placed in a 2000 mls. beaker and a 100 ml. portion of a 0.05 molar solution of ammonium chloride was added thereto. After gently stirring for 15 minutes at 150° F. the solution was emptied and the treatment repeated. The pad was thereafter washed with water, dried for 12 hours at 350° F. and immersed in a solution of 5.5 grams of ammonium molybdate, 4.45 grams of nickel sulfate and 50 ml. of water. After evaporating the solution to dryness on a steam plate, approximately 80% of the nickel and molybdenum were found to be on the pad.

The pad was thereafter inserted into an electrically heated stainless steel tube reactor measuring one inch outer diameter, the catalyst bed measuring 0.7 inch by 8 inches. 25 liters per hour of hydrogen was introduced through the bed and the bed heated to 800° F. over two 5 hour periods and then held at this temperature for an additional two hours. With the flow of hydrogen continuing the temperature of the reactor was reduced to 575° F. and a solvent refined-dewaxed paraffin distillate lubricating oil was charged to effect an improvement in color, oxidation stability, etc., of the oil. The process conditions were as follows: pressure, p.s.i.g. 1000; reactor temperature, ° F. 575; recycle gas in cubic feet per barrel, 4000; liquid hourly space velocity, 0.56; hydrogen consumption, s.c.f./bbl., 92.

| Sample | Charge | Product |
|---|---|---|
| Gravity, ° API | 29.2 | 29.3 |
| Flash, COC ° F | 440 | 440 |
| Fire, COC ° F | 515 | 500 |
| Viscosity SUS at 210° F | 53.9 | 53.7 |
| Color, Lovibond | [1] 35 | [2] 10 |
| Viscosity index | 90 | 93.5 |

[1] ½ inch. [2] 6 inch.

Example IX

To a one normal solution of sodium hydroxide maintained at 150° F., was added an excess over the stoichiometric equivalent of 99.99% aluminum. The resulting sodium aluminate solution was drawn into the coil of a 0.089 inch diameter by 19.7 foot stainless steel tube. The coil was repeatedly filled with and then emptied of the solution. After repeating the treatment several times the coil was drained and washed with distilled water.

Sodium silicate, sodium hydroxide, and water is mixed in the ratio of $$Na_2O/SiO_2 = 1$$
$$H_2O/Na_2O = \text{approximately } 18$$

Approximately 0.01 gram of finely powdered commercial grade Zeolite X is stirred into a 30 ml. portion of the above solution. 24 mls. of this solution is introduced into the coated tube by vacuum and the tube held at 80° F. for 4 days and periodically rotated about its longitudinal axis. The coil is then held for 24 hours at 212° F. and thereafter washed with 200 ml. portions of distilled water. By this technique sodium Zeolite X on alpha alumina trihydrate form the interior surface of the tube.

A 0.01 N nickel nitrate solution is prepared. With the coil upright and filled with the solution, 500 mls. of the nickel solution is allowed to pass dropwise from the coil. The coil is held at 150° F. and the total solution passage time is about 2 hours. The coil is then heated to 220° F. and dried with a flowing stream of hydrogen for 2 hours. Thereafter the temperature is raised to 900° F. with about 2 liters of hydrogen passing over the catalytic surface per hour. The tube is held at 900° F. for 2 hours, cooled to 750° F. and employed in the reduction of carbon monoxide, the feed consisting of, on a mole percent basis, hydrogen 89.0; nitrogen 2.0; carbon monoxide 4.5; methane 3.7; carbon dioxide 0.8; with a trace of oxygen. The feed is introduced at a space velocity of 470 and the tube is held at a temperature of 750° F. at a pressure of 40 p.s.i.g. By this technique carbon dioxide is reduced to 0.2 to 0.3 mole percent. Methane is present in the product gas in amounts of approximately 10 to 11 mole percent.

Example X

A coil of chrome steel mesh measuring approximately 2¼ inches in diameter by 5 inches weighing 51.8516 grams is coated with alpha alumina trihydrate as in the preceding examples. The coated pad weighs 271 grams.

A solution of 100 grams of sodium silicate and 35 grams of 30% commercial colloidal grade silica is mixed with 682 grams of water such that the $Na_2O/SiO_2$ ratio is 0.5 and the $H_2O/Na_2O$ ratio was 40. The alpha alumina trihydrate coated chrome steel mesh is placed in a screw-top jar and covered with 600 mls. of the above solution and held at 75° F. for 60 hours and thereafter for 24 hours at a temperature of 200° F. After the end of this crystallization period the pad is removed and water washed. The sodium forms of Zeolites Y and A are present on the surface of the alumina. The Y Zeolite represents approximately 75% of the zeolite mixture.

The pad is placed in a beaker and contacted batchwise with three 750 ml. portions of a 10% ammonium chloride solution at 100° F. and subsequently washed with three 750 ml. portions of distilled water at 100° F.

The pad is next contacted with 500 mls. of a 0.03 normal $(Pt(NH_3)_4)Cl_2$ solution at 150° F. for 2 hours, and thereafter with an additional 1500 ml. portion of a 0.02 normal platinum amine solution. The pad is washed with five 700 ml. portions of water, dried on a steam plate and then in a tube furnace heated slowly to 800° F. with a slolw stream of hydrogen. The pad is held at 800° F. for 2 hours and used in the hydrocracking of hexadecane, reaction conditions of which are 100 p.s.i.g. of hydrogen recycle per barrel of oil where the recycle is on a fresh 100% basis of hydrogen. The reaction temperature is 650° F. where 72.1 weight percent of hexadecane is converted to the following on a mole per 100 moles converted basis.

| | |
|---|---|
| Naphthalenes | 15 |
| Aromatics | Trace |
| Paraffins | 0 |
| $C_1$ | 1 |
| $C_2$ | 0 |
| $C_3$ | 8 |
| $C_4$ | 26 |
| $C_5$ | 23 |
| $C_6$ | 17 |
| $C_7$ | 20 |
| $C_8$ | 30 |
| $C_9$ | 23 |
| $C_{10}$ | 16 |
| $C_{11}$ | 16 |
| $C_{12}$ | 10 |

Example XI

Following the procedure of Example VII alpha alumina trihydrate is deposited on two titanium mesh pads. A solution of 95 grams of commercial colloidal silica (30% $SiO_2$, 0.13%, $Na_2O$), 35 grams of sodium metasilicate and 600 mls. of water is placed in an autoclave. The two wet pads are then added and the solution buffered with sodium bicarbonate and heated for 12 hours to 500° F. A portion of the alpha alumina trihydrate is converted to mordenite. The pads are thereafter water washed with hot ion exchange solutions of 10% ammonium chloride wherein the sodium content is reduced to below 0.5%. The pads are drained and treated with solution containing 0.22 gram of palladous dichlorodiammine and evaporated to dryness. Thereafter the pads are slowly heated to 700° F. in an electric oven and subsequently packed into a close fitting tube reactor, heated in a flowing stream of hydrogen for 1 hour at 850° F., thereafter cooled to 625° F., and with hydrogen flowing a high pour light distillate is introduced under the following operating conditions: LHSV (basis volume occupied by pads) 0.5; $H_2$ flow s.c.f./bbl. 7000; $H_2$ pressure p.s.i.g 750; reactor temperature ° F. 625.

| Yield | 100 | 67 |
|---|---|---|
| Sample | Charge | (¹) |
| Gravity, ° API | 30.4 | |
| Flash, COC ° F | 340 | 330 |
| Viscosity SUS 100° F | 66.4 | |
| Pour, ° F | 50 | −50 |
| IBP | 622 | 618 |
| 10 | 640 | 630 |
| 50 | 663 | 665 |
| 90 | 694 | 690 |
| 95 | 703 | 708 |
| EP | 718 | 722 |
| Percent disappearance of paraffins | | 90 |

¹ Stabilized product.

As indicated above, a substantial pour point reduction is secured by the selective cracking of the paraffins.

We claim:
1. An extended zeolitic structure comprising:
   (a) a support,
   (b) a layer of alumina on said support, and
   (c) a crystalline zeolitic aluminosilicate layer on and formed, in situ, from said alumina layer.
2. A structure according to claim 1 wherein said zeolitic layer comprises from 2 to 90 weight percent of the combined weight of layers (b) and (c).
3. A structure according to claim 1 wherein said zeolitic layer comprises from 5 to 40 weight percent of the combined weight of layers (b) and (c).
4. A structure according to claim 1 wherein said zeolitic layer is base exchanged with a catalytically active cation.
5. A method for preparing an extended zeolitic structure which comprises:
   (a) providing a support coated with a layer of hydrated alumina,
   (b) reacting said hydrated alumina layer with a nutrient composition comprising a source of silica and a source of an alkali metal oxide thereby forming, in situ, a crystalline aluminosilicate zeolite on said alumina layer.
6. A method according to claim 5 wherein step (b) is conducted at a temperature ranging from about room temperature to 600° F. for a period of at least 2 hours.
7. A method according to claim 5 wherein step (b) is initially conducted at a temperature ranging from about room temperature to 200° F. for a period of at least 24 hours and thereafter at a temperature of from 200 to 600° F. for a period of at least 1 hour.
8. A method according to claim 5 wherein said zeolite formed in situ in step (b) is base exchanged with a catalytically active cation.
9. A method according to claim 5 wherein a crystalline aluminosilicate zeolite is present in said nutrient composition in step (b).
10. A method according to claim 5 wherein said source of said silica and said alkali metal oxide is sodium silicate.
11. A method according to claim 5 wherein the mole ratio of said alumina and nutrient composition falls within the following:

$SiO_2/Al_2O_3$ — 1.0–25.0
$Na_2O/SiO_2$ — 0.1–5.0
$H_2O/Na_2O$, at least 10.

References Cited

UNITED STATES PATENTS

| 3,140,253 | 7/1964 | Plank et al. | 208—120 |
|---|---|---|---|
| 3,231,520 | 1/1966 | Leak et al. | 252—463 |
| 3,244,643 | 4/1966 | Schwartz | 252—455 |
| 3,367,886 | 2/1968 | Haden et al. | 252—455 |

PATRICK P. GARVIN, Primary Examiner

C. F. DEES, Assistant Examiner

U.S. Cl. X.R.

208—120

UNITED STATES PATENT OFFICE
CERTIFICATE OF CORRECTION

Patent No. 3,468,815　　　　　　　　　　　　September 23, 1969

Edward L. Cole et al.

It is certified that error appears in the above identified patent and that said Letters Patent are hereby corrected as shown below:

Column 2, line 28, "R." should read -- R, --. Column 4, line 32, cancel "rhenium, aluminum,"; line 71, "$M_{2/n} \cdot Al_2O_3 \cdot xSiO_2 \cdot yH_2O$" should read -- $M_{2/n}O \cdot Al_2O_3 \cdot xSiO \cdot yH_2O$ --.

Column 8, line 40, "0.01" should read -- 0.1 --. Column 9, line 11, "slolw" should read -- slow --. Column 10, line 32, "200° F." should read -- 100° F. --.

Signed and sealed this 15th day of September 1970.

(SEAL)

Attest:

Edward M. Fletcher, Jr.　　　　　　　　　WILLIAM E. SCHUYLER, JR.
Attesting Officer　　　　　　　　　　　　　Commissioner of Patents